United States Patent
Canis et al.

(10) Patent No.: US 7,676,567 B2
(45) Date of Patent: Mar. 9, 2010

(54) SYSTEM AND METHOD FOR MAPPING A NETWORK

(75) Inventors: Walter Canis, St. Louis, MO (US); John Thomas Cronin, Wildwood, MO (US); Dieter Gantenbein, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 1748 days.

(21) Appl. No.: 09/816,624

(22) Filed: Mar. 23, 2001

(65) Prior Publication Data
US 2002/0138608 A1  Sep. 26, 2002

(51) Int. Cl.
*G06F 15/173* (2006.01)
*G06F 3/00* (2006.01)

(52) U.S. Cl. .................... 709/224; 710/15
(58) Field of Classification Search .............. 709/224, 709/223; 710/15
See application file for complete search history.

(56) References Cited

U.S. PATENT DOCUMENTS

| | | | |
|---|---|---|---|
| 5,185,860 A * | 2/1993 | Wu .................... | 709/224 |
| 5,251,152 A | 10/1993 | Notess | |
| 5,293,635 A | 3/1994 | Faulk, Jr. et al. | |
| 5,450,601 A | 9/1995 | Okuda | |
| 5,471,617 A * | 11/1995 | Farrand et al. ........... | 718/100 |
| 5,483,631 A | 1/1996 | Nagai et al. | |
| 5,485,455 A | 1/1996 | Dobbins et al. | |
| 5,568,605 A * | 10/1996 | Clouston et al. ............ | 714/4 |
| 5,586,254 A | 12/1996 | Kondo et al. | |
| 5,606,664 A | 2/1997 | Brown et al. | |
| 5,659,543 A * | 8/1997 | Ater et al. .................. | 370/258 |
| 5,684,796 A | 11/1997 | Abidi et al. | |
| 5,802,303 A * | 9/1998 | Yamaguchi ................ | 709/224 |
| 5,845,062 A | 12/1998 | Branton, Jr. et al. | |
| 5,850,397 A | 12/1998 | Raab et al. | |
| 5,878,420 A * | 3/1999 | de la Salle ................. | 709/224 |
| 5,889,953 A * | 3/1999 | Thebaut et al. ............ | 709/221 |
| 5,917,808 A | 6/1999 | Kosbab | |
| 5,923,850 A | 7/1999 | Barroux | |

(Continued)

OTHER PUBLICATIONS

J. Case et al. "Request for Comments (RFC) 1157: A Simple Network Management Protocol", published by Network Working Group, May 1990.*
Howe, Denis. "poll", retreived from the Free On-Line Dictionary of Computing, originally posted Jan. 31, 1995, <http://foldoc.doc.ic.ac.uk/foldoc/foldoc.cgi?poll>, 1 page.*
Howe, Denis. "interrupt", retreived from the Free On-Line Dictionary of Computing, originally posted Feb. 7, 1995, <http://foldoc.doc.ic.ac.uk/foldoc/foldoc.cgi?interrupt>, 1 page.*

*Primary Examiner*—George C Neurauter, Jr.
(74) *Attorney, Agent, or Firm*—Anne Linne; Hoffman Warnick LLC (57) ABSTRACT

A system and method for mapping a network. Specifically, the present invention provides a non-intrusive system and method for identifying network attached devices as well as the details thereof. Under the present invention, a collection apparatus having collection tools is communicated with the network. The collection tools are operated to collect information from the devices. The device information is then analyzed to identify details of the devices. Once identified, the details are aggregated into a report.

21 Claims, 3 Drawing Sheets

U.S. PATENT DOCUMENTS

| | | | |
|---|---|---|---|
| 5,948,055 A * | 9/1999 | Pulsipher et al. | 709/202 |
| 5,964,837 A * | 10/1999 | Chao et al. | 709/224 |
| 5,987,516 A | 11/1999 | Rao et al. | |
| 6,003,074 A | 12/1999 | Vasconcellos | |
| 6,046,988 A | 4/2000 | Schenkel et al. | |
| 6,058,445 A | 5/2000 | Chari et al. | |
| 6,076,106 A | 6/2000 | Hamner et al. | |
| 6,101,528 A | 8/2000 | Butt | |
| 6,253,240 B1 * | 6/2001 | Axberg et al. | 709/223 |
| 6,282,175 B1 * | 8/2001 | Steele et al. | 370/254 |
| 6,421,719 B1 * | 7/2002 | Lewis et al. | 709/224 |
| 6,701,327 B1 * | 3/2004 | Jones et al. | 707/200 |

* cited by examiner

SYSTEM AND METHOD FOR MAPPING A NETWORK

BACKGROUND OF THE INVENTION

1. Technical Field

The present invention generally relates to a system and method for mapping a network. More particularly, the present invention relates to a non-intrusive system and method for identifying network devices as well as details thereof.

2. Background Art

As the use of Information Technology ("IT") in business grows, business entities are increasingly struggling with the management and control of their IT operations. Some entities are outsourcing the management and control to third party providers. However, before effective management and control can occur, the provider and/or the entity must first gather information to learn the full extent of the entity's IT operations (i.e., understand and map the entity's network). In mapping a network, the provider will generally learn: (1) what devices are on the network (e.g., one server, one router, two workstations, etc.), (2) the address of each device; (3) device characteristics (e.g., how much RAM the workstations have); (4) what software is on each device (e.g., workstation A has Microsoft Word™); and (5) software characteristics (e.g., software version) Accurate knowledge of the entity's IT operation allows the provider to quote an accurate price for managing and controlling the operation.

Although the entity can often provide a great deal of information regarding its IT operation, such information is often inaccurate and/or incomplete. Thus, the provider is typically forced to gather the information themselves. Currently, providers gather such information manually by visiting the entity's site and physically identifying all devices/hardware (e.g., servers, routers, workstations, laptops, printers, etc.) on the entity's network.

Such an approach is both inefficient and wrought with inaccuracies. Specifically, an entity with a large network (e.g., 10,000, 24,000, 100,000 workstations) requires the provider to send a multitude of workers to the entity's site. During this time, the provider's workers often disrupt the entity's work environment by, for example, requiring the entity's employees to move away from their workstations so that the workers can retrieve information. Not only is this manual process disruptive, but it may also be inaccurate due the portability of many network devices such as laptop computers. For example, the entity's network may include 100 laptop computers, only 50 of which are connected when the provider's employees are gathering information. Thus, the 50 unconnected laptops could go unreported.

In addition to identifying devices, the proper management and control of IT operations may also require information pertaining to device characteristics as well as any software installed on the devices. For example, the provider may need to know how much RAM each workstation has, what software programs are installed on each device, what operating system each workstation/laptop uses, etc. Similar to device identification, gathering such information generally requires the provider to go from device to device, disrupting the entity's employees in the process. Moreover, obtaining this information may require the provider to install additional software and/or collection tools on each network device. Not only could this corrupt the entity's network, but the costs associated therewith often make the job unprofitable for the provider.

Even if the provider is able to obtain all necessary information, the provider must resolve any conflicts that arise between collected information. Such conflicts could, for example, cause a device to be counted twice, or not at all. Resolving such conflicts is also often a manual and time consuming process.

Accordingly, there exists a need for an efficient system and method for mapping a network. Specifically, there exists a need for a system and method whereby a provider can learn the fall extent of an entity's IT operations without intruding on the entity's work environment. Thus, there exists a need for a system and method for mapping a network without having to accessing the entity's network attached devices. Moreover, there exists a need for such a system and method to be able to schedule information collection at various times so that all network devices are identified. Furthermore, there exists a need for a system and method that can resolve conflicts between collected information.

SUMMARY OF THE INVENTION

The present invention overcomes the drawbacks of existing methods and systems by providing a system and method for mapping a network. Specifically, the present invention provides a mapping system that includes collection tools installed on one or more collection apparatuses. The collection apparatuses are communicated with an entity's network so that all network device information required to completely and accurately map the network can be retrieved. The system and method also include a timer system so that information collection can occur at various times to prevent the miscounting of network devices. Moreover, the system and method of the present invention resolves any conflicts between information collected by the collection tools.

According to a first aspect of the present invention, a system for mapping a network is provided. The system comprises: (1) a collection system for collecting device information from devices on the network; (2) a timer system for collecting the device information at scheduled times; (3) an analysis system for analyzing the collected device information; and (4) a report system for generating a mapping report based on the analyzed device information.

According to a second aspect of the present invention, a system for mapping a network is provided. The system comprises: (1) a collection system that comprises collection tools for collecting device information from devices on the network; (2) a timer system for collecting the device information at scheduled times; (3) an analysis system for analyzing the device information, wherein the analysis system includes rules for resolving any conflicts between device information collected by the collection tools; and (4) a report system for generating a mapping report based on the analyzed device information.

According to a third aspect of the present invention, a method for mapping a network thereon is provided. The method comprises the steps of: (1) installing collection tools on a collection apparatus; (2) communicating the collection apparatus with the network; (3) operating the collection tools to collect device information from devices on the network; (4) analyzing the device information; and (5) reporting the analyzed device information.

According to a fourth aspect of the present invention, a program product stored on a recordable media for mapping a network is provided. When executed, the program product comprises: (1) a collection system for collecting device information from devices on the network; (2) a timer system for collecting the device information at scheduled times; (3) an analysis system for analyzing the collected device information; and (4) a report system for generating a mapping report based on the analyzed device information.

According to a fifth aspect of the present invention, a computer system for mapping a network is provided. The computer system comprises: (1) a processor; (2) a computer system memory; (3) an interface; and (4) a software product stored on the computer system memory and executable by the processor, wherein the software product comprises: (a) a collection system for collecting device information from devices on the network; (b) a timer system for collecting the device information at scheduled times; (c) an analysis system for analyzing the collected device information; and (d) a report system for generating a mapping report based on the analyzed device information.

Therefore, the present invention provides a system and method for mapping a network. Specifically, the system and method of the present invention provide an efficient, accurate, and non-intrusive way to determine the full extent of an entity's IT operation.

BRIEF DESCRIPTION OF THE DRAWINGS

These and other features and advantages of this invention will be more readily understood from the following detailed description of the various aspects of the invention taken in conjunction with the accompanying drawings in which.

It is noted that the drawings of the invention are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE DRAWINGS

For convenience, this description will include the following sections:

I. Definitions
II. Computer System
III. Mapping System

I. Definitions

Entity—a business or the like that requires management and control of its IT operations.

Provider—a party (internal or external to an entity) that manages and controls the IT operations of the entity.

Mapping—determining the extent of an entity's IT operations (network), including identifying, inter alia: network devices, device addresses, device characteristics, software installed on each device, and software characteristics.

Collection Tools—software tools that are used collect information from network devices to enable mapping of the network.

II. Computer System

Generally stated, the present invention provides a system and method for mapping a network. Specifically, the present invention provides a non-intrusive system and method for collecting information from network attached devices. The information is collected by communicating at least one collection apparatus (i.e., a computer), which includes collection tools, with the network. The collected information is then analyzed and aggregated to identify the full extent of the network. The system and method of the present invention allows information collection to occur at various times so that network devices are not miscounted. In addition, the system and method of the present invention resolves any conflicts between device information collected by the collection tools. It should be understood that although the present invention is preferably non-intrusive, it can be intrusive at the option of the provider and/or the entity (as will be further explained below).

Figure 1:
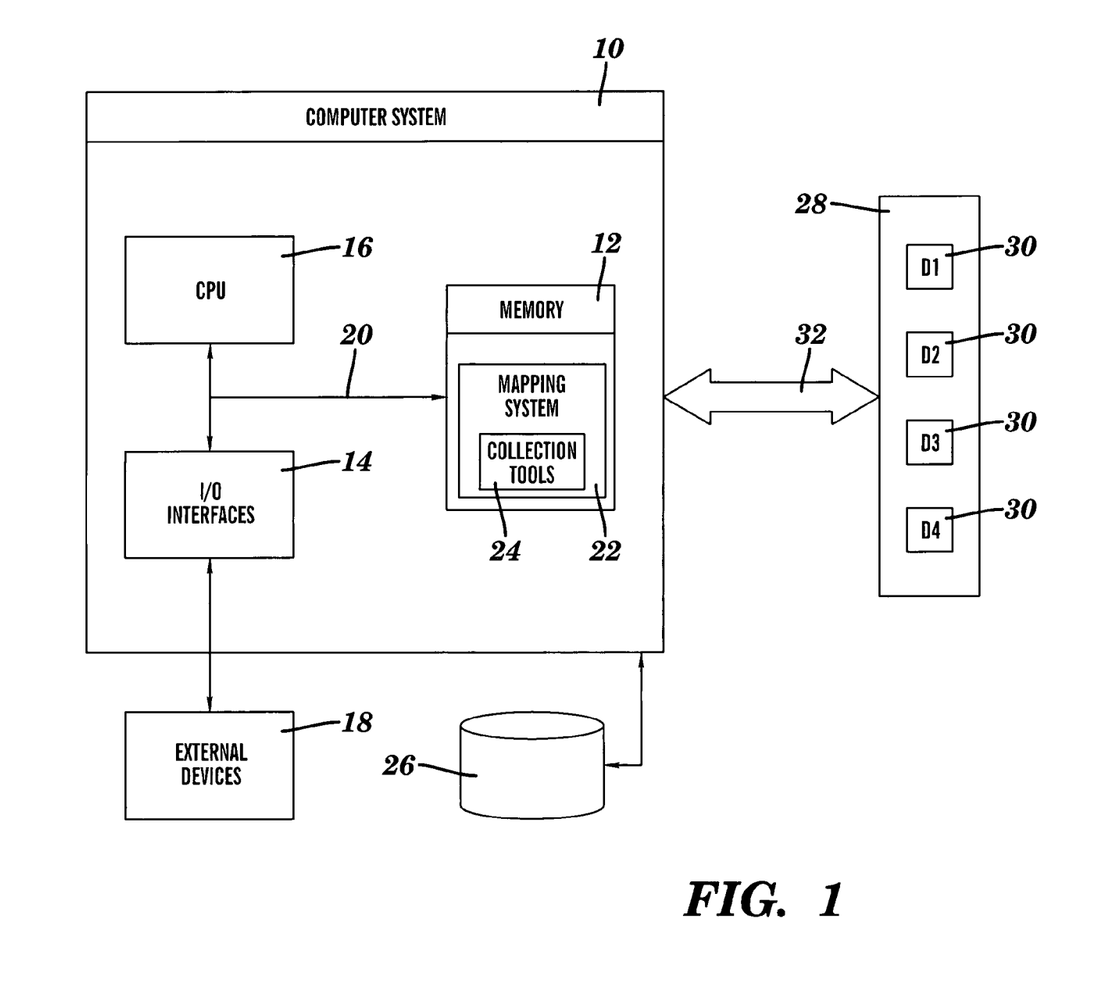
FIG. 1 depicts a computer system having a mapping system, according to the present invention.

Referring now to FIG. 1, a computer/server system 10 that includes the mapping system 22 of the present invention is shown. The computer system 10 generally comprises memory 12, input/output interfaces 14, a central processing unit (CPU) 16, external devices/resources 18, bus 20, and database 26. Memory 12 may comprise any known type of data storage and/or transmission media, including magnetic media, optical media, random access memory (RAM), read-only memory (ROM), a data cache, a data object, etc. Moreover, memory 12 may reside at a single physical location, comprising one or more types of data storage, or be distributed across a plurality of physical systems in various forms. CPU 16 may likewise comprise a single processing unit, or be distributed across one or more processing units in one or more locations, e.g., on a client and server.

I/O interfaces 14 may comprise any system for exchanging information from an external source. External devices 18 may comprise any known type of external device, including a CRT, LED screen, hand held device, keyboard, mouse, voice recognition system, speech output system, printer, facsimile, pager, personal digital assistant, cellular phone, web phone, onboard diagnostics, etc. Bus 20 provides a communication link between each of the components in the server system 10 and likewise may comprise any known type of transmission link, including electrical, optical, wireless, etc. In addition, although not shown, additional components, such as cache memory, communication systems, system software, etc., maybe incorporated into computer system 10.

Stored in memory 12 is mapping system 22 (shown in FIG. 1 as a software product). Mapping system 22 will be described in more detail below but generally comprises a system and method for using collection tools 24 to collect information pertaining to devices 30 on network 28. Once collected, the information is stored in database 26. Database 26 may comprise one or more storage devices, such as a magnetic disk drive or an optical disk drive. In another preferred embodiment, database 26 includes data distributed across, for example, a local area network (LAN), wide area network (WAN) or a storage area network (SAN) (not shown). Database 26 may also be configured in such a way that one of ordinary skill in the art may interpret it to include one or more databases.

As will be described in further detail below, computer system 10 is placed in communication with network 28. Collection tools 24 will then collect information pertaining to each device 30. The collected information is stored in the database 26 and then analyzed. Once analyzed, the information can be aggregated into a mapping report or the like.

Computer system 10 communicates with network 28 via communication link 32. Communication link 32 can be a direct or remote connection to network 28. As such computer system 10 may be connected to network 28 via the Internet, wide area networks (WAN), local area networks (LAN) or other private networks. Where the computer system 10 is connected to the network 28 via the Internet, connectivity could be provided, for example, by conventional TCP/IP sockets-based protocol. In this instance, the client would utilize an Internet service provider outside the system to establish connectivity to the system server within the system. It should be appreciated that although mapping system 22 is shown and described as residing one computer system 10, mapping system 22 could reside on several computer systems 10 that individually communicate with network 28. As such, computer system(s) 10 can be one or more workstations or laptops that directly connect to network 28 (i.e., at the entity's site), or remotely communicate with network 28 (i.e., over the Internet). In either embodiment, communication with network 28 is non-intrusive. That is, no physical or direct access to individual network devices is required.

It is understood that the present invention can be realized in hardware, software, or a combination of hardware and software. As indicated above, the computer system 10 according to the present invention can be realized in a centralized fashion in a single computerized workstation, or in a distributed fashion where different elements are spread across several interconnected computer systems (e.g., a network). Any kind of computer system—or other apparatus adapted for carrying out the methods described herein—is suited. A typical combination of hardware and software could be a general purpose computer system with a computer program that, when loaded and executed, controls the computer system 10 such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

III. Mapping System

Figure 2:
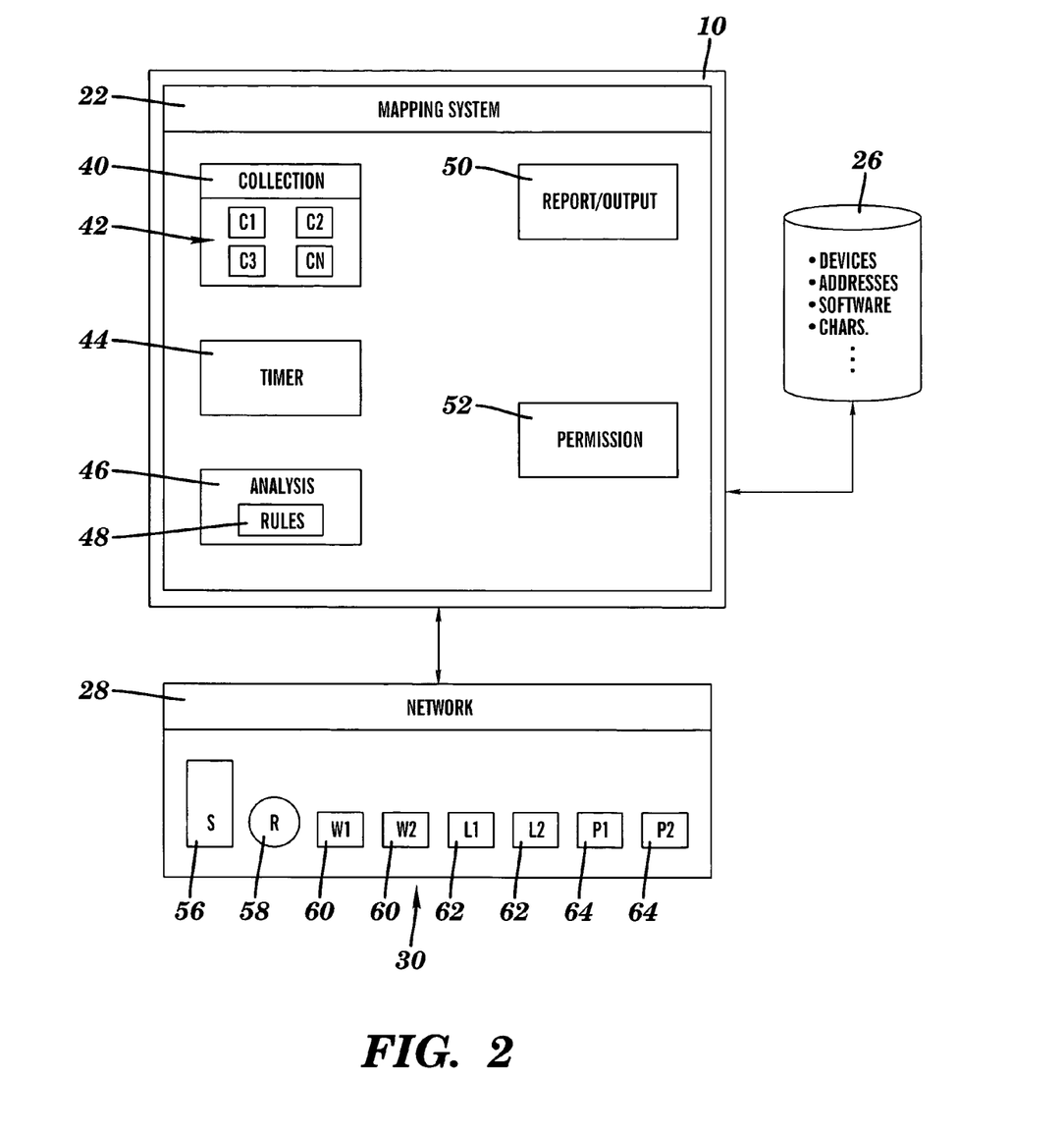
FIG. 2 depicts a box diagram of the mapping system of FIG. 1 in communication with a network having devices thereon.

Referring now to FIG. 2, the mapping system 22 is shown in greater detail. As indicated above, mapping system 22 resides on at least one collection apparatus (i.e., computer system 10) that non-intrusively communicates with network 28 to identify all network attached devices 30 as well as various details relating thereto. In one embodiment mapping system 32 resides on multiple collection apparatuses (e.g., laptops, workstations, etc.) that are individually communicated with network 28. Under such an embodiment, each collection apparatus preferably has a different operating system (e.g., Windows, Linux, Macintosh) so that information can be collected from all network devices 30, regardless of the operating system running thereon. In an alternative embodiment, mapping system 22 resides on one collection apparatus that is equipped to interact with all operating systems. In either embodiment, communication with network 28 can occur directly (i.e., at the entity's site), or remotely (i.e., over the Internet). Either embodiment enables the full extent of network 28 to be determined. As depicted, network 28 includes server 56, router 58, workstations 60, laptops 62 and printers 64. However, it should be understood that the devices 30 shown are not intended to be limiting and network 28 could include other devices.

Once communication is established, collection system 40 retrieves information from each device 30. In particular, collection system 40 is comprised of various software collection tools 42. Collection tools 42 are well known in the art and generally comprise software programs that are designed to retrieve certain information from devices 30. Example of such collections tools are Ecora™ by Ecora Corp. and Asset360™ by Percuity, LLC. Preferably, each collection tool 42 retrieves a different type of information. For example, collection tool C1 could be a "pinging" collection program that sends and receives signals through the network to identify the particular devices 30 on network 28. Thus, collection tool C1 would identify that the network includes server 56, router 58, workstations 60, laptops 62 and printers 64. Alternatively, collection tool C2 could be a device characteristic tool that identifies particular characteristics of each device 30. For example, collection tool C2 may identify how much RAM each workstation 60 has. Collectively, collection tools 42 preferably collect device information relating to: device identity/type; device characteristics (e.g., RAM, available hard drive space, processor speed, etc.); device addresses; software installed on the devices (e.g., WordPerfect, Windows, etc.); and software characteristics (e.g., software version). However, it should be understood that this list is not intended to be limiting and other types of information could be retrieved. In addition, it should be understood that each collection tool need not collect a different type of information. For example, the collection system 40 could include only one collection tool 42 that collects all necessary information. Moreover, multiple collection tools (e.g., C1 and C2) could collect the same information, which could be compared for accuracy.

Timer system 44 interfaces with collection system 40 to control the times at which information collection occurs. This prevents disconnectable devices from going unidentified. For example, laptops 62 may be disconnected from network 28 when an initial information collection occurs. Under the existing manual systems, information is typically collected only once, which would result in laptops 62 going unidentified. By utilizing timer system 44 of the present invention, information can be collected at predetermined times (e.g., every four hours for a one week period). Thus if an employee was traveling with his/her laptop 62 when the initial information collection occurred, but returned the next day, timer system 44 would allow laptop 62 to be later identified. Timer system 44 could be based on an internal clock of either computer system 10 or network 28.

As it is being collected, the device information is stored in database 26. Analysis system 46 will analyze/parse the information to determine the full extent of the network. For example, analysis system 46 will analyze the collected information and determine that e.g., network 28 includes two workstations 60 with Windows operating systems at "abc" and "xzy" addresses, etc. Included in the analysis process is the resolving of any conflicts between the information collected by collection tools 42. Specifically, collection tool C1 may have collected information that conflicts with information collected by collection tool C2. For example, collection tool C1 may have identified a different address for workstation W1 than did collection tool C2. To resolve such conflicts, analysis system 46 preferably includes conflict resolution rules 48. Rules 48 may dictate, for example, that in the event of a conflict between collection tools C1 and C2, collection tool C1 "prevails." Under previous systems, such conflicts often went unresolved resulting in an inaccurate depiction of network 28 (e.g., device W1 got counted twice, or not at all).

Once all devices and necessary details thereof have been identified by analysis system 46, the analyzed information can then be aggregated for inclusion in a mapping report or the like. For example, aggregation may group workstation 60 details in one section and laptop 62 details in another section. As such aggregation may occur according to the provider's or the entity's preference and can be performed either by analysis system 46 or report system 50. Once aggregated, report system 50 generates the mapping report based on the analyzed/aggregated device information to inform the provider and the entity of the full extent of network 28. The mapping report could comprise text, tables, a GUI representation of network 28, etc., and can be outputted (e.g., via hard copy, email, etc.) to the provider and/or the entity.

As indicated above, there may be some instances where a provider wishes to access to the entity's network 28, as opposed to merely communicating. For example, the provider may require access to certain files stored on network 28 or install software on various network attached devices to obtain further information. Alternatively, the provider may wish to view or alter certain administrative settings of network 28. In such a case, mapping system 22 could include permission system 52 that allows the provider to "log" onto network 28 as a user. Permission system 28 could be, for example, a standard password interface that permits access to network 28 and/or devices 30. This would allow the present invention to access network 28 and network devices 30 without physically intruding on the entity. It should be understood, however, that such access is not required to fully map an entity's network. Rather, such access is optional and is for collecting further information.

Figure 3:
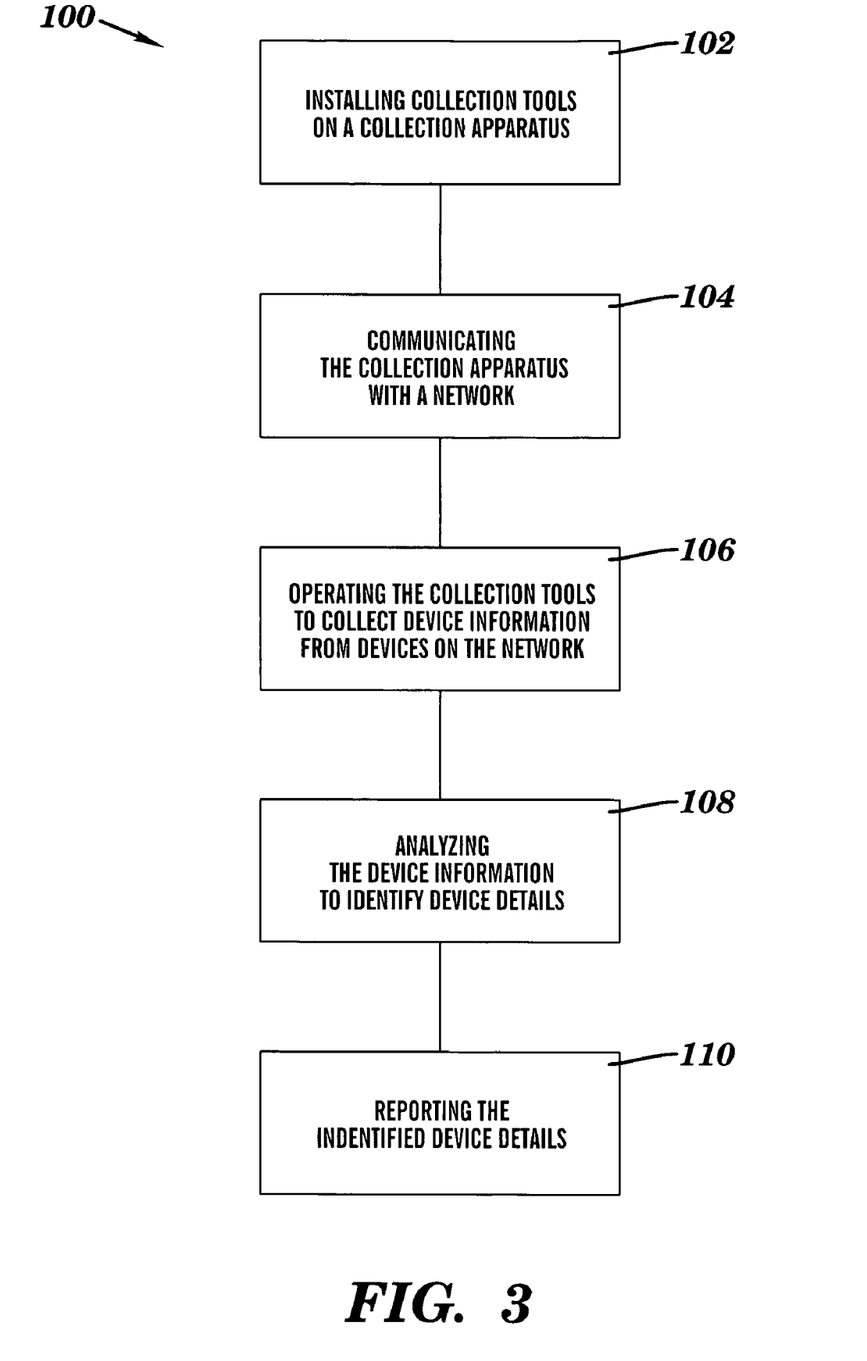
FIG. 3 depicts a flow chart of a method, according to the present invention.

Referring now to FIG. 3, a method 100 according to the present invention is shown. First step 102 of method 100 is to install collection tools on a collection apparatus. Second step 104 is to communicate the collection apparatus with the network. Third step 106 is to operate the collection tools to collect device information from devices on the network. Fourth step 108 of method 100 is to analyze the device information. Fifth step 110 is to report the analyzed device information.

Thus, the system and method of the present invention allow the full extent of a network to be determined without intruding on the entity's work environment. Specifically, the present invention requires neither direct access nor installation of software on any of the network devices. This prevents, inter alia, workplace distraction such as the entity's employees from having to move away from or surrender their workstations for the provider. In addition, by including timer system 44 and rules 48, the problems associated with disconnectable devices and conflicts are easily resolved.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A system for mapping a network, comprising:
   a collection system for collecting device identification and detail information from devices on the network by querying each device to retrieve the device identification and detail information, wherein the detail information includes device characteristic information and software information, the collection system comprising:
   a plurality of collection tools, wherein at least a first collection tool is configured to collect at least a first subset of the device identification and detail information for at least a first operating system, and at least a second collection tool is configured to collect at least a second subset of the device identification and detail information for at least a second operating system;
   a timer system for collecting the device identification and detail information at predetermined scheduled times;
   an analysis system for analyzing the collected device identification and detail information comprising rules for resolving any conflicts between device identification and detail information collected by the plurality of collection tools and configured to resolve conflicts between information for the at least first and second device identification and detail information and the at least first and second operating system; and
   a report system for generating a mapping report based on the analyzed device identification and detail information.

2. The system of claim 1, wherein the device identification and detail information includes device identities, device types, device addresses, device characteristics including amount of RAM, operating system including version and application software including version installed on the devices, and software characteristics of the devices on the network.

3. The system of claim 2, wherein the generated mapping report includes the device identities, device types, the device addresses, the device characteristics, the operating system and application software installed on the devices, and the software characteristics.

4. The system of claim 1, further comprising a permission system for gaining user access to the network.

5. A system for mapping a network, comprising:
   a collection system that comprises a plurality of collection tools for collecting device identification and detail information from devices on the network by querying each device to retrieve the device identification and detail information, wherein the detail information includes device characteristic information and software information, and wherein at least a first collection tool is configured to collect at least a first subset of the device identification and detail information for at least a first operating system, and at least a second collection tool is configured to collect at least a second subset of the device identification and detail information for at least a second operating system;
   a timer system for collecting the device identification and detail information at predetermined scheduled times;
   an analysis system for analyzing the device identification and detail information, wherein the analysis system includes rules for resolving any conflicts between device identification and detail information collected by the plurality collection tools and configured to resolve conflicts between information for the at least first and second device identification and detail information and the at least first and second operating system; and
   a report system for generating a mapping report based on the analyzed device identification and detail information.

6. The system of claim 5, wherein the device identification and detail information includes device identities, device types, device addresses, device characteristics including amount of RAM, operating system including version and application software including version installed on the devices, and software characteristics for the devices on the network.

7. The system of claim 6, wherein the mapping report generated by the report system identifies the device identities, device types, the device addresses, the device characteristics, the operating system and application software installed on the devices, and the software characteristics.

8. The system of claim 7, wherein the report system outputs the generated report.

9. The system of claim 5, further comprising a permission system for gaining user access to the network.

10. A method for mapping a network, comprising the steps of:
   installing a plurality of collection tools on a collection apparatus;
   communicating with the network using the collection apparatus;
   operating the plurality of collection tools to collect device identification and detail information from devices on the network by querying each device to retrieve the device identification and detail information, wherein the detail information includes device characteristic information and software information, and wherein at least a first collection tool is configured to collect at least a first subset of the device identification and detail information for at least a first operating system, and at least a second collection tool being configured to collect at least a second subset of the device identification and detail information for at least a second operating system;
   analyzing the device identification and detail information, wherein analyzing comprises resolving any conflicts between device identification and detail information collected by the plurality of collection tools and resolving conflicts between information for the at least first and second device identification and detail information and the at least first and second operating system; and
   reporting the analyzed device identification and detail information.

11. The method of claim 10, wherein the collection apparatus comprises at least one processor.

12. The method of clam 10, wherein the device identification and detail information includes device types, device addresses, device characteristics including amount of RAM, operating system including version and application software including version installed on the devices, and software characteristics for the devices on the network.

13. The method of claim 10, wherein the reporting step comprises the step of generating a mapping report based on the analyzed device identification and detail information.

14. A program product stored on a recordable media for mapping a network, which when executed, comprises:
   a collection system for collecting device identification and detail information from devices on the network by querying each device to retrieve the device identification and detail information, wherein the detail information includes device characteristic information and software information, the collection system comprising:
      a plurality of collection tools, wherein at least a first collection tool is configured to collect at least a first subset of the device identification and detail information for at least a first operating system, and at least a second collection tool is configured to collect at least a second subset of the device identification and detail information for at least a second operating system;
   a timer system for collecting the device identification and detail information at predetermined scheduled times;
   an analysis system for analyzing the collected device identification and detail information comprising rules for resolving any conflicts between device identification and detail information collected by the plurality of collection tools and configured to resolve conflicts between information for the at least first and second device identification and detail information and the at least first and second operating system; and
   a report system for generating a mapping report based on the analyzed device identification and detail information.

15. The program product of claim 14, wherein the device identification and detail information includes device identities, device types, device addresses, device characteristics including amount of RAM, operating system including version and application software including version installed on the devices, and software characteristics of the devices on the network.

16. The program product of claim 15, wherein the generated mapping report identifies the device identities, device types, the device addresses, the device characteristics, the operating system and application software installed on the devices, and the software characteristics.

17. The program product of claim 14, further comprising a permission system for gaining user access to the network and the devices.

18. A computer system for mapping a network, comprising:
   a processor;
   a computer system memory;
   an interface; and
   a software product stored on the computer system memory and executable by the processor, wherein the software product comprises:
      a collection system for collecting device identification and detail information from devices on the network by querying each device to retrieve the device identification and detail information, wherein the detail information includes device characteristic information and software information, wherein the collection system comprises:
         a plurality of collection tools, wherein at least a first collection tool is configured to collect at least a first subset of the device identification and detail information for at least a first operating system, and at least a second collection tool is configured to collect at least a second subset of the device identification and detail information for at least a second operating system;
      a timer system for collecting the device identification and detail information at predetermined scheduled times;
      an analysis system for analyzing the collected device identification and detail information comprising rules for resolving any conflicts between device identification and detail information collected by the plurality of collection tools and configured to resolve conflicts between information for the at least first and second device identification and detail information and the at least first and second operating system; and
      a report system for generating a mapping report based on the analyzed device identification and detail information.

19. The computer system of claim 18, wherein the device identification and detail information includes device identities, device types, device addresses, device characteristics including amount of RAM, operating system including version and application software including version installed on the devices, and software characteristics of the devices on the network.

20. The computer system of claim 19, wherein the generated mapping report identifies the device identities, device types, the device addresses, the device characteristics, the operating system and application software installed on the devices, and the software characteristics.

21. The computer system of claim 18, further comprising a permission system for gaining user access to the network.

* * * * *